United States Patent
Chini et al.

(10) Patent No.: US 7,466,650 B2
(45) Date of Patent: Dec. 16, 2008

(54) SYSTEM, METHOD AND APPARATUS FOR ADAPTIVE VIDEO SURVEILLANCE OVER POWER LINES

(75) Inventors: Ahmad Chini, Maple (CA); Ron Yekutiel, Thornhill (CA); David Kerzner, North York (CA)

(73) Assignee: Visualgate Systems, Inc., Toronto (CA)

( * ) Notice: Subject to any disclaimer, the term of this patent is extended or adjusted under 35 U.S.C. 154(b) by 629 days.

(21) Appl. No.: 10/935,175

(22) Filed: Sep. 8, 2004

(65) Prior Publication Data

US 2006/0050642 A1 Mar. 9, 2006

(51) Int. Cl.
*H04J 1/16* (2006.01)
*H04L 5/22* (2006.01)

(52) U.S. Cl. .................. 370/230; 370/252; 370/299
(58) Field of Classification Search ............... None
See application file for complete search history.

(56) References Cited

U.S. PATENT DOCUMENTS

| | | | |
|---|---|---|---|
| 6,223,225 B1 | 4/2001 | Bisdikian et al. | |
| 6,392,692 B1 | 5/2002 | Monroe | |
| 6,501,377 B2 | 12/2002 | Ebata et al. | |
| 6,658,091 B1 | 12/2003 | Naidoo et al. | |
| 6,704,329 B2 | 3/2004 | Martin | |
| 7,006,559 B1* | 2/2006 | Mardinian | 375/222 |
| 2002/0170064 A1 | 11/2002 | Monroe et al. | |
| 2002/0175995 A1 | 11/2002 | Sleeckx | |
| 2003/0081665 A1* | 5/2003 | Tokairin | 375/222 |
| 2003/0107648 A1 | 6/2003 | Stewart et al. | |
| 2003/0204749 A1* | 10/2003 | Pugh et al. | 713/201 |
| 2004/0028391 A1 | 2/2004 | Black et al. | |
| 2004/0068583 A1 | 4/2004 | Monroe et al. | |
| 2004/0086091 A1 | 5/2004 | Naidoo et al. | |
| 2004/0155757 A1 | 8/2004 | Litwin, Jr. et al. | |
| 2004/0174851 A1* | 9/2004 | Zalitzky et al. | 370/338 |

FOREIGN PATENT DOCUMENTS

CA 2 389 958 3/2003

OTHER PUBLICATIONS

Notification of Transmittal of International Preliminary Report on Patentability dated Jan. 17, 2007 issued by the PCT Office.

* cited by examiner

*Primary Examiner*—Chi H. Pham
*Assistant Examiner*—Soon D. Hyun
(74) *Attorney, Agent, or Firm*—Bereskin & Parr; Isis E. Caulder

(57) ABSTRACT

Video surveillance systems have special requirements with respect to networking and remote access functionality. Conventional communication links do not necessarily meet these requirements. Power line channels, accessible via power line modems, do, in some cases, meet the requirements of video surveillance systems where conventional communication links do not. The present invention provides a flexible and reliable video surveillance system that includes networking and remote access capabilities employing power line communication channels.

11 Claims, 8 Drawing Sheets

| BO \ VM | 0.02 to 0.2 | 0.2 to 0.4 | 0.4 to 0.6 | 0.6 to 0.8 | 0.8 to 1 |
|---|---|---|---|---|---|
| 0 to 0.5 | FPS = 5<br>Q = High<br>E = MPEG4 | FPS = 10<br>Q = High<br>E = MPEG4 | FPS = 15<br>Q = High<br>E = MPEG4 | FPS = 20<br>Q = High<br>E = MPEG4 | FPS = 30<br>Q = High<br>E = MPEG4 |
| 0.5 to 0.8 | FPS = 2<br>Q = Medium<br>E = MJPEG | FPS = 5<br>Q = Medium<br>E = MPEG4 | FPS = 10<br>Q = Medium<br>E = MPEG4 | FPS = 15<br>Q = Medium<br>E = MPEG4 | FPS = 20<br>Q = Medium<br>E = MPEG4 |
| 0.8 to 1 | FPS = 1<br>Q = Medium<br>E = MJPEG | FPS = 2<br>Q = Medium<br>E = MJPEG | FPS = 5<br>Q = Low<br>E = MPEG4 | FPS = 10<br>Q = Low<br>E = MPEG4 | FPS = 15<br>Q = Low<br>E = MPEG4 |

FIG. 8

SYSTEM, METHOD AND APPARATUS FOR ADAPTIVE VIDEO SURVEILLANCE OVER POWER LINES

FIELD OF THE INVENTION

The invention relates to video surveillance systems and, in particular, to video surveillance systems including networking and remote access capabilities.

BACKGROUND OF THE INVENTION

Video surveillance technology has advanced substantially over the past few years. Many video surveillance systems have adopted digital imaging, recording and processing technologies in an attempt to more efficiently record, process, search and access video information.

The use of digital imaging, recording and processing technologies has been a key enabler for adapting video surveillance systems to further include networking and remote access capabilities. Video surveillance systems with networking and remote access capabilities are referred to as networked video surveillance systems hereinafter.

Typically, a conventional network modem is used to add networking and remote access capabilities to a piece of surveillance equipment. The inclusion of a conventional network modem permits a particular piece of surveillance equipment to be treated as a network node. Conventional network modems are limited to particular communication technologies such as telephony, cable, CAT5 Ethernet, and various wireless networks. Each of these conventional communication technologies requires access to a corresponding specific type of communication channel in addition to a power supply system required to energize a particular modem. Consequently, deployment of a networked video surveillance system is limited to those areas that have access to a specific type of requisite communication channel. Moreover, each access method has merits and drawbacks that make each access method preferable for some applications and not others.

A dedicated wired network, such as CAT5 Ethernet, is preferable for applications requiring high bandwidth and high video quality. A location that does not have a requisite network connection must be retro-fitted to include the necessary wiring. New wire installation is costly and wired networks cannot be conveniently redeployed as network nodes are considered fixed as a result of their wired network connection. In some cases (e.g. home networking), new wire installation and/or repositioning of existing wiring is not welcome for a variety of reasons that include inconvenience, esthetics and additional cost.

Networking over shared telephony lines is a related alternative. However, as for dedicated wired networks, a surveillance location must have a telephone connection or be retro-fitted to include one. Thus, the deployment of a video surveillance system employing telephony lines still requires the existence of a respective network connection for each surveillance location.

Wireless networks are somewhat more flexible than wired networks. However, wireless networks do have a number of drawbacks that include issues relating to system security and low levels of received signal strength relating to the location of a wireless modem.

In particular, wireless networks are sometimes limited by signal propagation through certain spaces that may prevent a wireless signal from being transmitted or received from a particular geographic location. For example, in some instances it is difficult to set up a wireless link to a particular location within a building (e.g. inside an elevator, an underground parking garage, etc.) from another location inside or outside the same building. Thus, video surveillance of a location is sometimes not possible using a wireless link since the received signal strength is not high enough to enable demodulation and decoding of video information carried on a respective wireless signal.

With respect to security issues, wireless networks are susceptible to eavesdropping and other forms of interference, including jamming. These issues, if not adequately addressed, allow a system to be easily compromised. This is highly undesirable because video surveillance systems are often employed in security and privacy sensitive applications.

SUMMARY OF THE INVENTION

According to an aspect of an embodiment of the invention there is provided a surveillance network node including a power line modem; a second modem; a switching means for selecting one of the power line modem and the second modem for a transmission of surveillance information; and a computer usable medium having computer readable code means embodied therein for signalling the switching means to select one of the power line modem and the second modem for transmission of surveillance information.

In some embodiments the surveillance information includes at least one of video information, audio information, and motion information.

In some embodiments, the computer readable code means includes instructions for: measuring respective parameters corresponding to the power line modem and the second modem; and choosing to use one of the power line modem and the second modem based on the respective measured parameters.

In some embodiments, the computer readable code means includes instructions for adaptively changing operating parameters of the surveillance network node based on at least one of surveillance source information, channel information and client preferences. In related embodiments the operating parameters include at least one of the number of Frames Per Second (FPS) transmitted, image Quality (Q), resolution, and encoding type.

In some embodiments the computer readable code means includes instructions for adaptively changing the operation of the surveillance network node based on measured communication link conditions related to one of the power line modem and the second modem. In related embodiments the communication link conditions include available bit rate in a channel, delay, congestion, and any other parameter that suitably provides an indication of the quality of the communication link.

In some embodiments a surveillance network node is further adapted to function as surveillance camera operable to transmit video information.

In some embodiments a surveillance network node is further adapted to function as a local access node operable to co-ordinate one of the operation and access to a number of other surveillance network nodes.

According to another aspect of an embodiment of the invention there is provided a method of operating a surveillance network node including measuring a parameter related to one of surveillance source information, channel information and client preferences; and changing an operating parameter of the surveillance network node based on the measured parameter.

In some embodiments, a method also includes measuring at least two different parameters related to one of surveillance source information, channel information and client preferences; and changing at least one operating parameter of the surveillance network node based on the at least two different measured parameters.

According to another aspect of an embodiment of the invention there is provided a networked surveillance system including a plurality of surveillance network nodes each having a power line modem, a second modem, a switching means for selecting one of the power line modem and the second modem for a transmission of surveillance information and a controller for signalling the switching means to select one of the power line modem and the second modem; and a client device configured to access surveillance information collected and transmitted by at least one of the surveillance network nodes.

In some embodiments a networked surveillance system also includes a local access node connectable between the client device and at least one of the surveillance network nodes.

In some embodiments the local access node is connectable to one of an internet, a private network and a virtual private network.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings that illustrate aspects of embodiments of the present invention and in which:

FIG. 8 is one very specific example of a look-up table suitable for use with the control method described with reference to FIG. 7.

DETAILED DESCRIPTION OF THE INVENTION

The aforementioned conventional networking technologies all require communication channel access that is separate and distinct from other supporting systems included in a surveillance network node. For example, a power supply system is required to energize the electronics of each surveillance network node. A particular power supply system might include a connection to a power supply grid that is accessible to a surveillance network node. In such cases, a respective power grid connection at each surveillance location is a requirement of the overall system. Moreover, such connections typically exist and are generally considered widely available as compared to connections to conventional communication channels.

Power line modems have recently been developed to facilitate communication over power lines of a power grid. As one specific example, the industry alliance HomePlug has organized a standard for such devices. Power line modems have been provided with features included in other networking modems, such as, without limitation, advanced error correction and adaptive channel estimation in order to manage and correct errors in data transmissions. Similar to wireless technologies, the bandwidth available in a power line system is typically limited and channel conditions are time variant as a consequence of high levels of interference injected into the power grid by appliances and possibly other network nodes. In order to provide a multi-node video surveillance network employing power line modems, advanced video compression and adaptive rate control techniques are required. Accordingly, aspects of embodiments of the present invention provide advanced video compression and adaptive rate control techniques that enable the use of power line modems for video surveillance applications.

Figure 1:
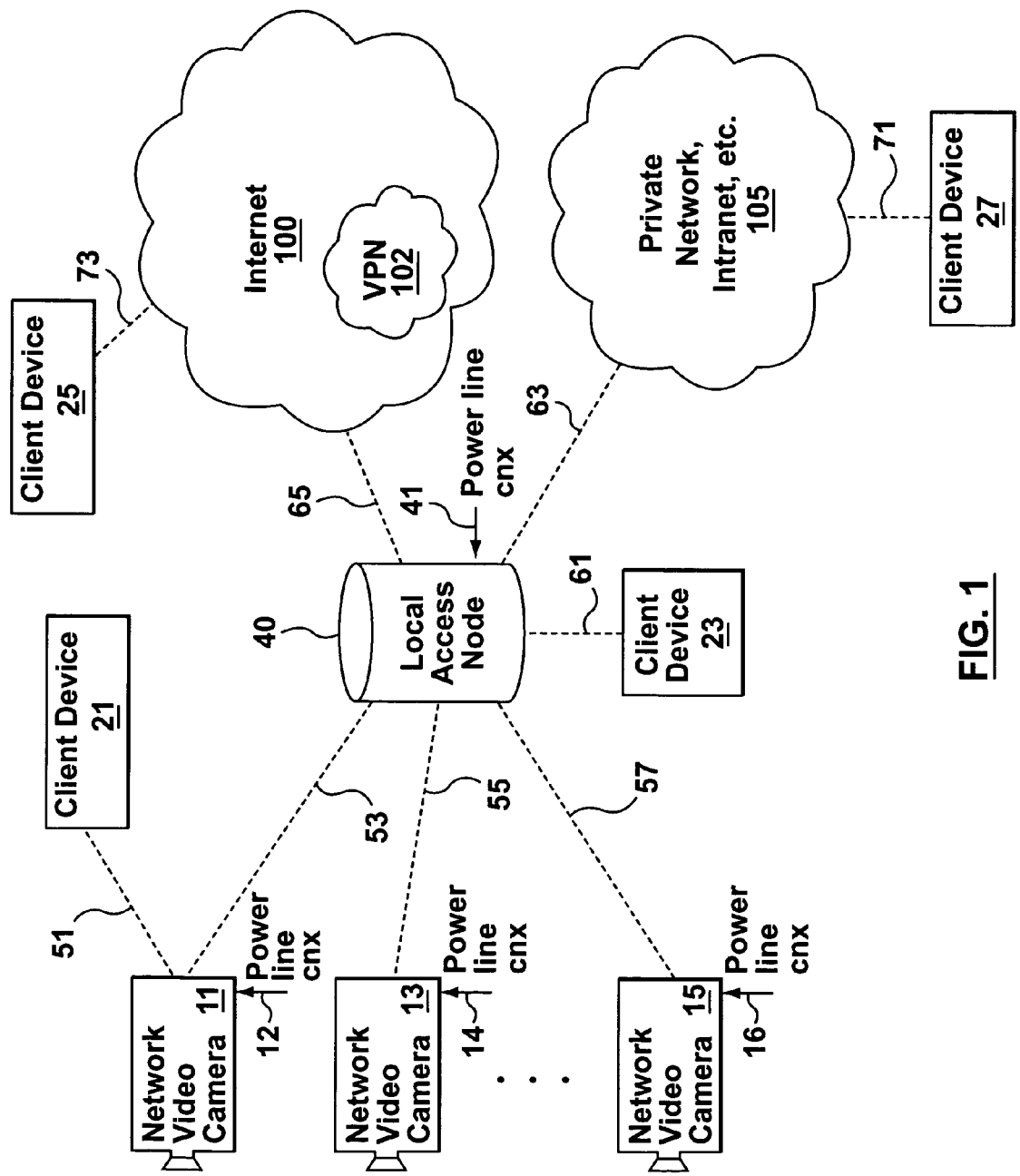
FIG. 1 is a schematic drawing of a networked video surveillance system according to aspects of an embodiment of the invention.

Referring to FIG. 1, shown is a schematic drawing of an example of a networked video surveillance system according to aspects of an embodiment of the invention. The networked video surveillance system includes a local access node 40, a number of client devices 21, 23, 25 and 27, and a number of network video cameras 11, 13 and 15. The networked video surveillance system also includes access to other networks shown, for example, as an internet 100, a Virtual Private Network (VPN) 102 within the internet 100, and a private network (e.g. an intranet or the like) 105. The networked video surveillance system illustrated in FIG. 1 is only one very specific example configuration of a networked video surveillance system that includes aspects of embodiments of the invention. It is to be understood that, in general, a networked video surveillance system, according to aspects of an embodiment of the invention, includes any suitable combination of devices and connections to other networks and/or systems in addition to any suitable combination of hardware, software and firmware for supporting desired functionality and modes of operation.

The client devices 21, 23, 25 and 27 can be embodied in any number of forms. For example, in some embodiments a particular client device is, without limitation, one of a cell phone, Personal Digital Assistant (PDA), computer, server, network terminal, television, video monitor, projection device, appliance, etc.

The local access node 40 is connected to the network video cameras 11, 13 and 15 via respective communication links 53, 55 and 57. In some embodiments the local access node 40 is also configured to establish and maintain communication links with other devices, systems and networks employed and/or co-operating with the networked video surveillance system. For example, as illustrated in FIG. 1, the local access node 40 is connected to the client device 23, the private network 105 and the internet 100 via respective communication links 61, 63 and 65. In different embodiments, the local access node 40 has a suitable combination of functionality that includes, without limitation, network and data routing, switching, bridging, repeating and managing of local network security.

Connections to other networks, such as the internet 100 and the private network 105, provide remote access capabilities to the networked video surveillance system through connections to the other networks. For example, as illustrated in FIG. 1, a communication link 73 connects the client device 25 to the internet 100 that is in turn connected to the local access node 40. Consequently, the client device 25 is remotely connected to the local access node 40 through the internet 100. In another similar example illustrated in FIG. 1, a communication link 71 connects the client device 27 to the private network 105. Consequently, the client device 27 is connected to the local access node 40 through the private network 105. In view of these brief examples, those skilled in the art will appreciate that various connections to a local access node (e.g. local access node 40) can be made through any suitable combination of communication links through and/or between a variety of different communication systems.

In some embodiments, a network video camera may be further adapted to establish and maintain a communication link that is independent of a local access node. In fact, in such embodiments a local access node is optionally not included as an element of the video surveillance network. For example, as illustrated in FIG. 1, the network video camera 11 is connected to client device 21 via communication link 51. In operation the communication link 51 may be used to perform diagnostic work on the network video camera 11 from the client device 21 and/or to provide the client device 21 with local video surveillance options. Alternatively and/or additionally, the network video cameras that make up the video surveillance network may operate to form an ad hoc distributed network that does not necessarily include a central control element (e.g. a local access node).

The local access node 40 and the network video cameras 11, 13 and 15 include power line connections 41, 12, 14 and 16, respectively. In some embodiments the power line connections 41, 12, 14 and 16 have at least two functions within the networked video surveillance system. The first function of each power line connection is to serve as an electrical energy supply port that accepts electrical energy that is employed during the operation of a particular device. The second function of each power line connection is to serve as a communication port for communications transmitted and received over available portions of communication bandwidth on power lines that are hereinafter referred to as power line channels. To this end, the local access node 40 and the network video cameras 11, 13 and 15 are each equipped with a power line modem. The integration of a power line modem into the network video camera 11 is described below in more detail with reference to FIGS. 2 and 4.

The communication links 51, 53, 55, 57 and 61 may each be established and maintained over a power line channel or some suitable combination of power line channels. In fact, communication link 63 can also be made over a power line channel if the private network 105 supports power line connectivity for communications. The devices on both ends of a power line channel must include a power line modem in order to accommodate communications over power lines. Those skilled in the art will appreciate that power line channels are not currently employed in large portions of the internet 100. Accordingly, the communication link 65 will typically be limited to some type of conventional network connection. This situation may change as power line communication technology evolves and is integrated into different portions of the existing internet.

Additionally and/or alternatively, the communication links 51, 53, 55, 57 and 61 may each be made over some type of conventional communication link. In such cases, the power line channels may be employed as back-up communication links to provide a minimum level of service when one or more conventional communication links fail.

In operation the local access node 40 serves as a central or primary connection node in the networked video surveillance system. In effect, the local access node 40 serves to primarily control co-ordination of transmissions between the network video cameras 11, 13 and 15 and other devices connected to the networked video surveillance system. In this configuration at least three modes of communication are possible within the networked video surveillance system.

In a first mode of operation a client device directly accesses one or more network video cameras, in effect, by-passing the co-ordination control of a local access node. An example of this is illustrated in FIG. 1, in which the client device 21 is directly connected to the network video camera 11 by the communication link 51. In this particular example, the client device 21 may be a PDA or notebook computer that is configured to provide diagnostic support and/or maintenance updates to the network video camera 11. Alternatively, the client device 21 may be configured to only accept video information provided by the network video camera 11 so that the video information can be viewed locally using the client device 21.

In a second mode of operation a client device accesses one or more network video cameras through a direct communication link with a local access node. An example of this is illustrated in FIG. 1, in which the client device 23 is directly connected to the local access node 40 via communication link 61. In this particular example, the client device may be a computer or network terminal that is co-located and/or integrated with the local access node 40. Alternatively, the client device 23 may be one of a number of devices that is suitable for some combination of displaying, storing, analyzing and processing video information.

In a third mode of operation a client device remotely accesses one or more network video cameras through an indirect communication link to a local access node. Examples of this are illustrated in FIG. 1, in which the client devices 25 and 27 are connected to the local access node by way of the internet 100 and the private network 105, respectively. Each of the client device 25 and 27 may be one of a number of devices that is suitable for some combination of displaying, storing, analyzing and processing video information.

Figure 2:
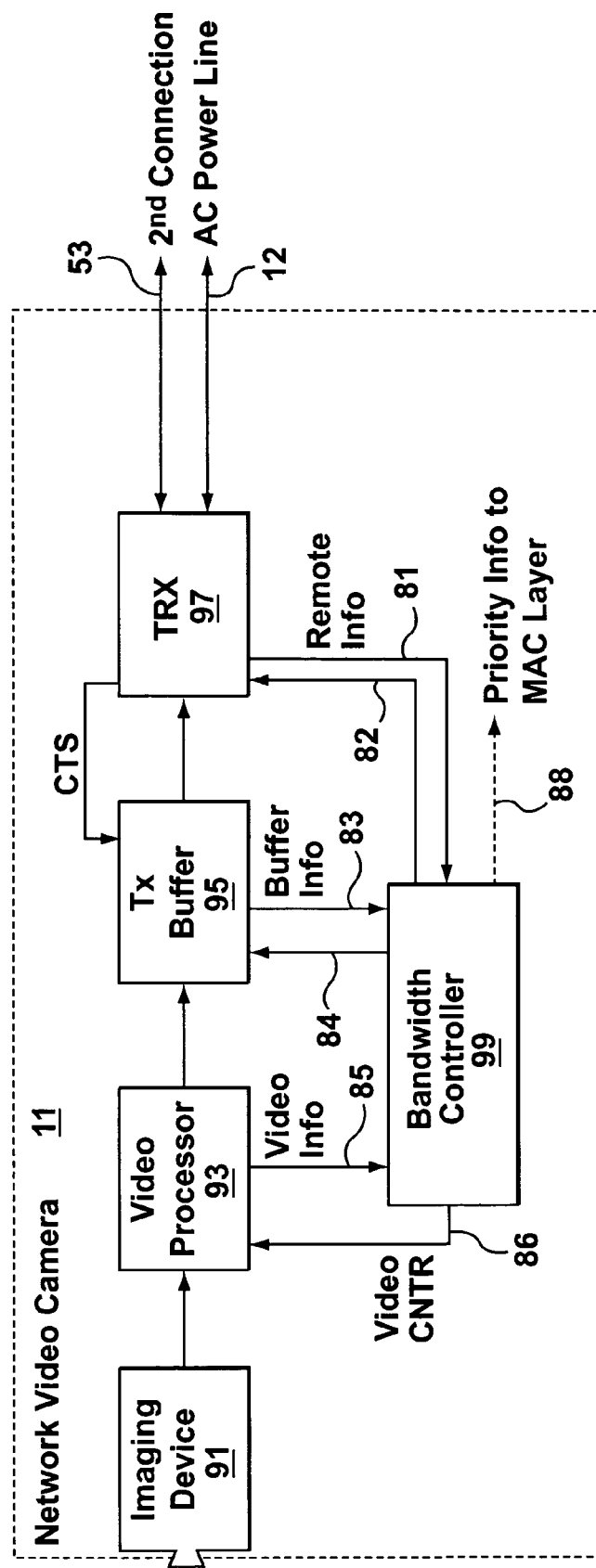
FIG. 2 is a schematic drawing of a network video camera suited for use in the networked video surveillance system of FIG. 1.

Referring now to FIG. 2 with continued reference to FIG. 1, the network video camera 11 is illustrated schematically in more detail. Those skilled in the art will appreciate that a network video camera includes a suitable combination of hardware, software and firmware to support the operation of the network video camera, and only those elements required to discuss some specific aspects of an embodiment of the invention are present in FIG. 2. Accordingly, as shown in FIG. 2, the network video camera 11 includes an imaging device 91, video processor 93, a transmission (Tx) buffer 95, a transceiver (TRX) 97 and a bandwidth controller 99.

The imaging device 91, the video processor 93, the Tx buffer 95 and the TRX 97 are respectively connected in series. The bandwidth controller 99 is bi-directionally coupled to each of the video processor 93, the Tx buffer 95 and the TRX 97. Specifically, the bandwidth controller 99 provides the video processor 93 with a video control (CTRL) signal 86, and the video processor 93 provides the bandwidth controller 99 with a video information signal 85. Similarly, the bandwidth controller 99 provides the Tx buffer 95 with a buffer control signal 84, and the Tx buffer 95 provides the bandwidth controller 99 with a buffer information signal 83. The bandwidth controller 99 provides the TRX 97 with a TRX control signal 82, and the TRX 97 provides the bandwidth controller 99 with a remote information signal 81. The controller also optionally outputs a priority information signal 88 that is sent to a Media Access Control (MAC) layer (not shown) within the network video camera 11. Additionally, the TRX 97 provides the Tx buffer 95 with a Clear To Send (CTS) signal to control flow of data packets though the TRX 97.

The imaging device 91 is any suitable device that is operable to collect video information in at least one of analog and digital form. An analog video stream from the imaging device 91 is first digitized before further operations on the video information are carried out. On the other hand, a digital video stream can be sent directly to the video processor 93 for further processing, without the need for pre-processing.

The video processor 93 is typically in the form of a Digital Signal Processing (DSP) device (e.g. a chip or set of chips) that is appropriately configured to process video information collected via the imaging device 91. Accordingly, in some embodiments the video processor 93 includes a computer readable code means having instructions for a number of video processing methods and features that include, without limitation, motion detection, motion estimation and video compression.

In some embodiments variations of each video processing method and function may exist and be provided within the video processor 93. A desired variation or combination of variations may be selected by appropriate messaging on the video control signal 86 from the bandwidth controller 99. For example, a method chosen for video compression may be selected from one of MPEG, MJPEG, H.263 and Microsoft Media 9™ based on outputs of one or more bandwidth management methods carried out in the bandwidth controller 99. In some embodiments, motion information extracted from processing a video stream is sent to the bandwidth controller 99 so that it can be used in the one or more bandwidth management methods.

In some embodiments, values for parameters such as frame resolution, number of frames per second and pixel bit depth can also be set through use of the video control signal 86 in some embodiments. Moreover, in some embodiments it is desirable for each picture frame to carry header information that enables playback of a video stream in a client device. Such information includes time stamp and resolution information.

The Tx buffer 95 is a memory module that is operated in a First In First Out (FIFO) manner. The Tx buffer 95 is used to average out and compensate for fast variations of a level of throughput in a communication channel (e.g. power-line channel, or conventional communication channel) as well as bit rate variations due to motion in the video source. As noted above buffer information, which includes the instantaneous amount of data in the Tx buffer 95, is sent to the bandwidth controller 99 in the buffer information signal 83.

The TRX 97 provides at least two ports for external connection to the network video camera 11. Alternatively, in some embodiments, only one external communication port is provided, which is used to send and receive data via a power line connection. As illustrated in FIG. 2, such connections include a second connection 53 to a conventional network link and the power line connection 12 (shown in FIG. 1). Further details about the TRX 97 are provided below with further reference to FIG. 3.

The bandwidth controller 99 is typically in the form of a micro-processor supported by a suitable combination of memory devices, software and firmware. In some embodiments, the bandwidth controller 99 and the video processor 93 share a portion of the hardware included in a network video camera 11. The bandwidth controller 99 uses the various types of information to select a suitable combination of methods and feature sets that in turn regulate the compressed video bit rate. As noted above, the types of information include video source information, buffer information and remote information from the video processor 93, the Tx buffer 95 and the TRX 97, respectively. In particular, the bandwidth controller 99 derives a joint source and channel dynamic optimization level using motion information, buffer information and remote information.

Additionally, remote information includes, without limitation, buffer information from the local access node 40, channel information, client capabilities and preferences. Client preferences include, without limitation, maximum delay tolerance, preferred data rate range, preferred frames per second range and preferred frame resolution range. By using this type of information, a compression method may be adapted and a video compression rate may be regulated. In some instances, video transmission may be seized if no motion is detected for a programmable amount of time and be reinstated once motion is detected. Similarly, video information includes, without limitation, bit rates, video quality, and an amount of motion in the video stream.

In some embodiments it is desirable to regulate video bit rate to prevent overflow and underflow in the Tx buffer 95. Accordingly, in some embodiments, the amount of data stored in the Tx buffer 95 as well as its rate of change is employed in the bandwidth management methods of the bandwidth controller 99.

Figure 5:
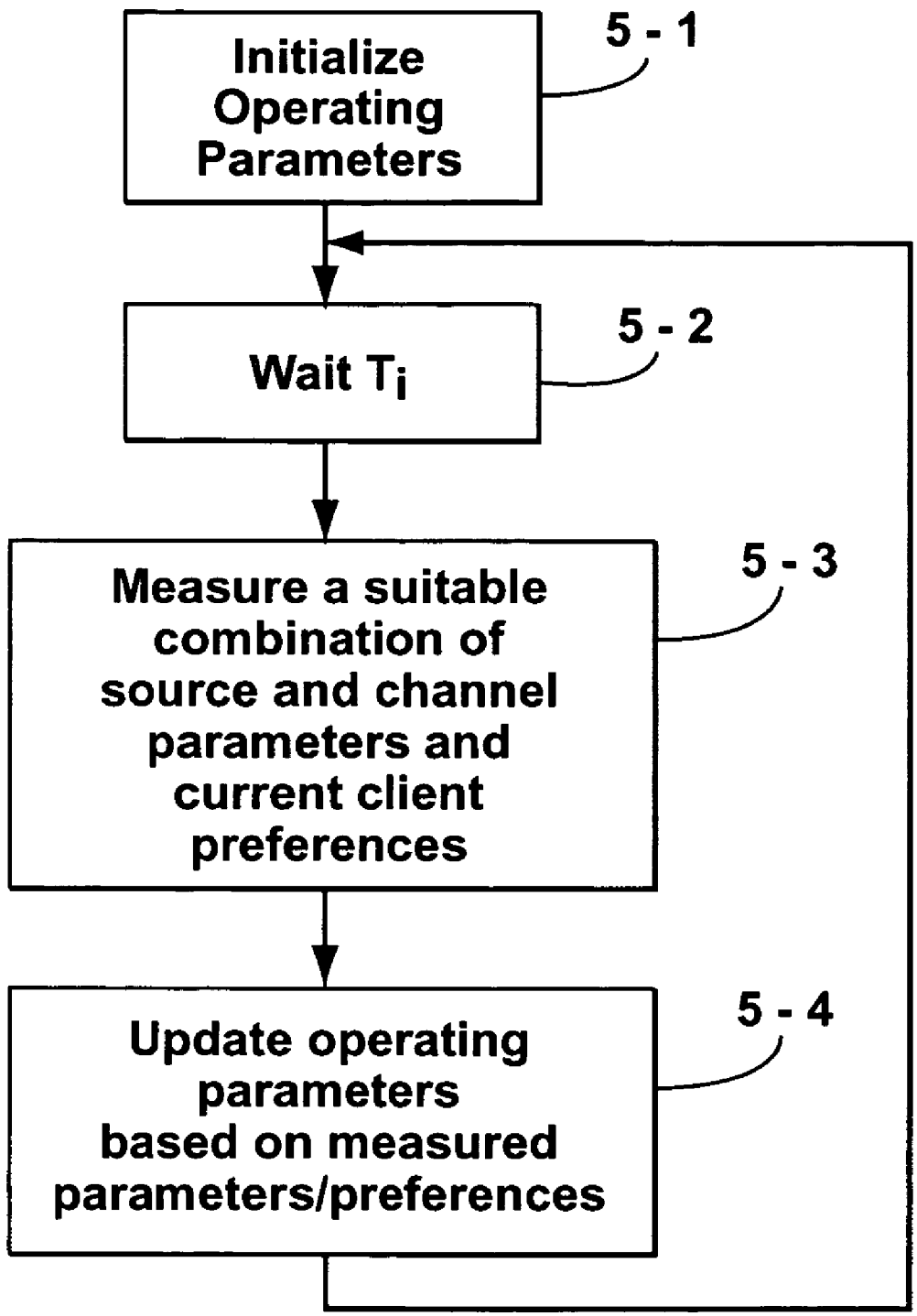
FIG. 5 is a flow chart illustrating an example of a generalized control method for the operation of the network video camera shown in FIG. 2 according to aspects of an embodiment of the invention.
Figure 6:
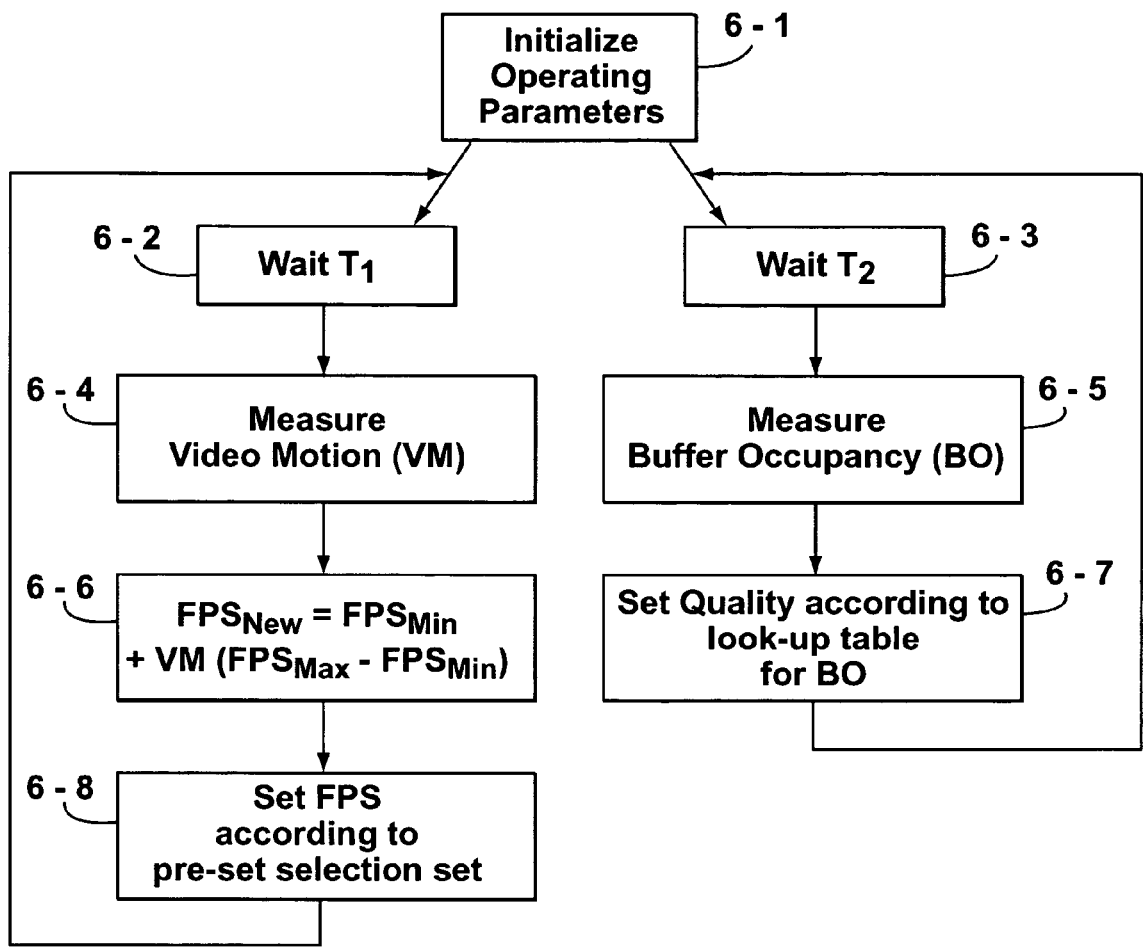
FIG. 6 is a flow chart illustrating a first specific example of a control method for the operation of the network video camera shown in FIG. 2 according to aspects of an embodiment of the invention.
Figure 7:
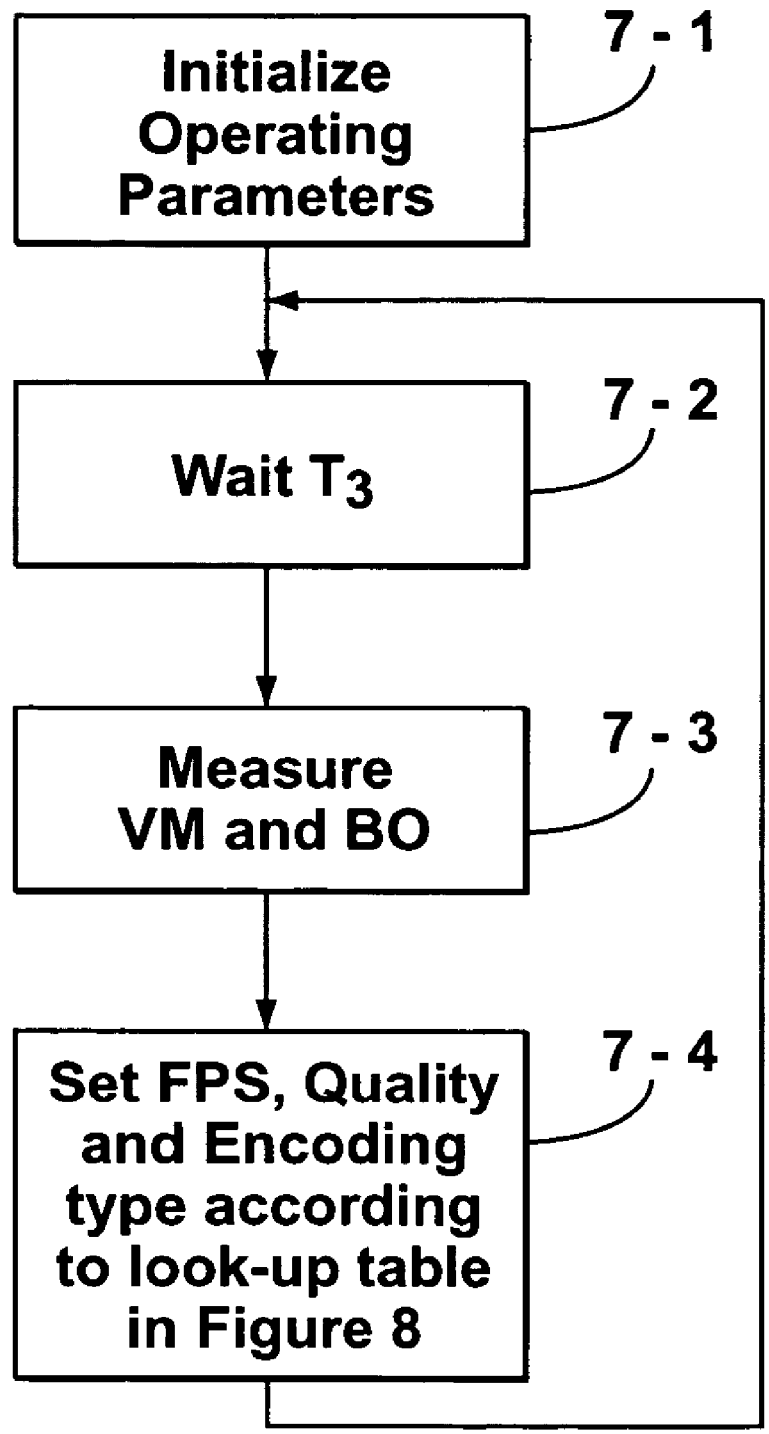
FIG. 7 is a flow chart illustrating a second specific example of a control method for the operation of the network video camera shown in FIG. 2.

In operation a network video camera, such as the network video camera 11, employs a method of adaptation, which adjusts the video bandwidth and quality according to video source information, a measure of channel quality (i.e. channel information) and the client requirements. FIGS. 5, 6 and 7, described in detail below, provide examples of methods of combining video source information, channel quality, and client requirements to adjust and manage bandwidth requirements for transmissions made by a network camera.

Figure 3:
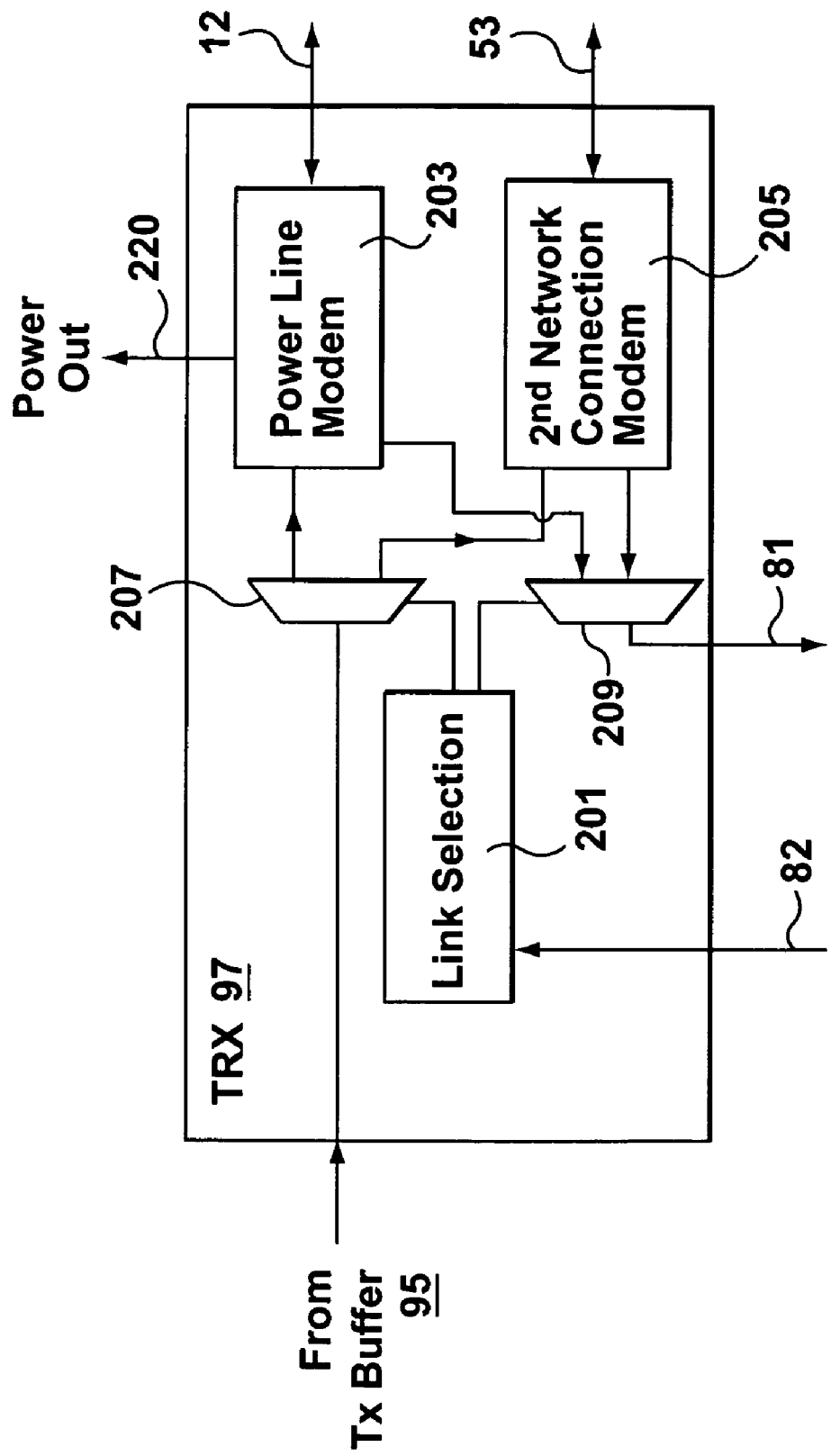
FIG. 3 is a schematic drawing of a transceiver included in the network video camera shown in FIG. 2.

Referring now to FIG. 3, illustrated is a schematic drawing of the TRX 97 included in the network video camera 11 shown in FIG. 2. As illustrated in FIG. 2, the TRX 97 includes bidirectional connections 12 and 53 to a power line connection and a conventional network link, respectively. The TRX 97 is also configured to receive an input from the Tx buffer 95 and the control input 82 from the bandwidth controller 99. The TRX 97 supplies an output power feed 220 and a remote information signal 81.

Internally, the TRX 97 includes a link selection block 201, a first MUX (i.e. multiplexer) 207, a second MUX 209, a power line modem 203 and a $2^{nd}$ network connection modem 205. The link selection block 201 provides control inputs to both the first and second MUX's 207 and 209.

The first MUX 207 is coupled to accept the video stream input from the Tx buffer 95. The first MUX 207 is configured to switch the video stream input between the power line modem 203 and the $2^{nd}$ network connection modem 205.

The second MUX 209 is coupled to receive remote information input streams from the power line modem 203 and the $2^{nd}$ network connection modem 205. The second MUX 209 is configured to switch one of the two remote information input streams to the bandwidth controller 99 as the remote information signal 81.

The power line modem 203 serves to modulate a video stream from the Tx buffer 95 onto a power line channel, demodulate remote information received from the power line channel (or another). In some embodiments, a power converter (e.g. a rectifier) is embedded into the power line modem 203 that permits the power line modem 203 to also serve as the power supply system for the network video camera 11. Accordingly, electrical energy is delivered to the rest of the network video camera 11 via the output power feed 220.

The $2^{nd}$ network connection modem 205 serves to modulate a video stream from the Tx buffer 95 onto an alternate communication channel, demodulate remote information received from the alternate communication channel (or another).

The TRX 97 can be operated in one of a number of modes. According to a first mode of operation, the power line modem 203 serves to maintain a primary communication link for the network video camera 11, and the $2^{nd}$ network connection modem 205 serves to back-up the power line modem 203. According to a second mode of operation, the $2^{nd}$ network connection modem 205 serves to operate a primary communication link for the network video camera 11, and the power line modem 203 serves to back-up the $2^{nd}$ network connection modem 205. In a third mode of operation the link selection block 201 dynamically selects which of the two modems has access to a better channel and diverts communications (in either direction) through the appropriate modem.

In the first mode of operation, the link selection block 201 sets the control signals to the first and second MUX's 207, 209 to couple transmission and reception of signals through the power line modem 203. In the event the power line modem 203 fails, the link selection block 201 sets the control signals to the first and second MUX's 207, 209 to couple transmission and reception of signals through the $2^{nd}$ network connection modem 205.

Similarly, in the second mode of operation, the link selection block 201 sets the control signals to the first and second MUX's 207, 209 to couple transmission and reception of signals through the $2^{nd}$ network connection mode 205. In the event the $2^{nd}$ network connection mode 205 fails, the link selection block 201 sets the control signals to the first and second MUX's 207, 209 to couple transmission and reception of signals through the power line modem 203.

In the third mode of operation, the link selection block 201 uses information received in the control signal 82 to dynamically set the control signals to the first and second MUX's 207, 209. The modem that has access to the better channel is chosen for transmission and reception of signals from the network video camera 11. The transmission and reception of signals can each occur through separate modems, in the event that the transmission channel available to one modem is better than that available for the other, while the reception channel available to the other is better than that available to the one.

Figure 4:
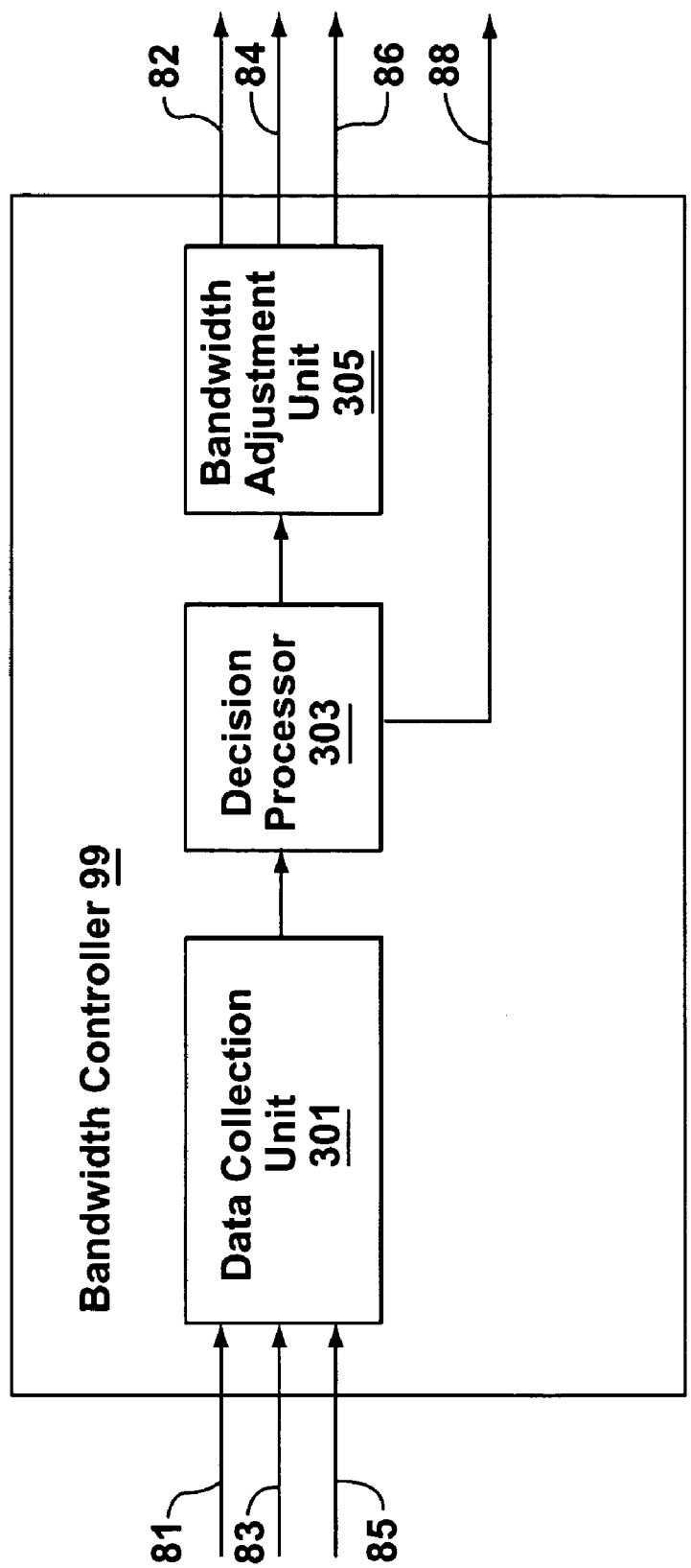
FIG. 4 is a schematic drawing of a bandwidth controller included in the network video camera shown in FIG. 2.

FIG. 4 shows a schematic drawing of the bandwidth controller 99 included in the network video camera shown in FIG. 2. As illustrated in FIG. 2, the bandwidth controller 99 includes input connections for accepting the remote information signal 81, the buffer information signal 83, and the video information signal 85. The bandwidth controller 99 also includes output connections for providing the TRX control signal 82, the buffer control signal 84, the video control signal 86 and the priority information signal 88.

Internally, the bandwidth controller 99 includes a data collection unit 301, a decision processor 303, and a bandwidth adjustment unit 305 respectfully connected in series.

The data collection unit 301 accepts the remote information signal 81, the buffer information signal 83, and the video information signal 85. The data collection unit 301 may include a memory module and a computer programmable code means suitable for supporting a database for the various forms of information collected during the operation of the network video camera 11.

The decision processor 303 is generally composed of a computer programmable codes means adapted for applying a method of parsing the various forms of information compiled by the data collection unit 301. As will be described in detail below, with reference to the examples detailed in FIGS. 5, 6 and 7, the decision processor 303 operates to generate a bandwidth requirement adjustment decision based on the various forms of information compiled by the data collection unit 301. Moreover, the decision processor 303 also produces the priority information delivered to the MAC layer employed by the network video camera 11.

The bandwidth adjustment unit 305 generally serves to translate outputs from the decision processor 303 into the TRX control signal 82, the buffer control signal 84, and the video control signal 86. Accordingly, the bandwidth adjustment unit 305 generally includes a computer programmable code means suitable for translating outputs of the decision processor 303 into the control signals provided to other elements of the network video camera 11.

It was noted above that a network video camera, such as the network video camera 11, employs a method of adaptation, which adjusts the required video bandwidth needed for transmissions and quality according to video source information, a measure of channel quality (i.e. channel information) and the client requirements. In various embodiments, a suitable combination of measured video source information, channel quality and the client requirements is used to select operating parameters of a network video camera. The operating parameters include, without limitation, selections for the number of frames per second captured and transmitted, the resolution of the video stream, the quality of individual pixels and the type video encoding employed. Each of the operating parameters has an effect on the bandwidth required for transmissions from a particular network video camera. Thus, by changing the operating parameters the bandwidth required for transmissions from a particular network video camera increases, decreases or stays the same, but is optimized for a current situation. Those skilled in the art will appreciate that various other operating parameters may also be varied based on a suitable combination of measured parameters that include, without limitation, video (or another type of surveillance information) source information, channel quality and client preferences.

In some embodiments, the number of Frames Per Second (FPS) transmitted is adjustable to values within a selection set that are either fixed or variable. For example, the value for the FPS might be chosen from a selection set of [0, 0.1, 0.2, 0.5, 1, 2, 5, 10, 15, 20, 25, 30].

Similarly, in some embodiments, the resolution of the video stream is adjustable to values/formats within a selection set that are either fixed or variable. For example, the value/format for the resolution might be chosen from a selection set of [VGA, CIF, QCIF].

Similarly, in some embodiments, the image Quality (Q), which is a measure of the bit accuracy of image pixels, is adjustable to values within a selection set that are either fixed or variable. For example, the value of Q might be chosen from a selection set of [Very Low, Low, Medium, High, Very High].

Similarly, in some embodiments, the encoding type is adjustable to values/formats within a selection set that are either fixed or variable. For example the encoding type might be chosen from a selection set of [MJPEG, MPEG4].

Moreover, in some embodiments, one or more operating parameters are initialized over a range of values as opposed to a single value point. For example, the FPS may be specified as range defined by a minimum and maximum value, $FPS_{min}$ and $FPS_{max}$, respectively. In related embodiments, the specific value of the FPS may be a function of one or both of $FPS_{min}$ and $FPS_{max}$. In one example, $FPS_{min}$ is used when there is little or no motion (e.g. set to 0.1) in a video stream and $FPS_{max}$ is used when there is full motion in the video stream (e.g. set to 25). When the video stream contains an amount of motion that is between the two extremes a value between $FPS_{min}$ and $FPS_{max}$ is used.

In some embodiments, an operating parameter is specified as a preferred or soft value. The preferred value is one that is preferred by a client but is amenable to change should there be a requirement for a change. For example, a preferred resolution, is the value of the resolution preferred by a client (e.g. CIF). In another example, a preferred encoding type, is the encoding type preferred by user (e.g. MJPEG).

FIG. 5 shows a flow chart illustrating an example of a generalized control method that employs a suitable combination of measured parameters and client requirements to update operating parameters of a network video camera (e.g. the network video camera 11 shown in FIG. 2) according to an embodiment of the invention. Although, the control method illustrated in FIG. 5 has been shown as a linear combination of method steps those skilled in the art will appreciate that the generalized control method presented herein may be adapted to include another suitable combination of method steps, such as, for example, a set of recursive method steps.

Starting at step 5-1, the operating parameters for a network video camera are set to a suitable initial combination of settings and ranges. In some embodiments, the initialization of the operating parameters for a combination of network video cameras occurs simultaneously according to directions provided by a local control node (or another client device) included in a networked camera video surveillance system. In other embodiments, each network video camera initializes its own operating parameters according to a suitable combination of pre-programmed values and initial measurements of external stimuli from the surrounding environment of a respective surveillance location.

The network video camera, at step 5-2, waits for a fixed or pre-programmable variable amount of time before seeking more information for updating its operating parameters. However, in other embodiments, directions may be provided from a local control node (or another client device) that forces the network video camera to update its operating parameters after some pre-set delay. In either case, the delay provided by step 5-2 provides a control point for controlling the rate at which operating parameters are adjusted.

At step 5-3, a suitable combination of video source information, channel information, and current client requirements/preferences is collected. In some embodiments, this collection can be done in part by a local control node (or another client device) and then transmitted to one or a number of network video cameras.

At step 5-4, the operating parameters are adjusted based on the measurements made at step 5-3. In some embodiments, each network video camera operates independently to update its own set of operating parameters. In other embodiments, calculations and/or comparisons of measured parameters can be made at a local control node so that the operating parameters for a combination of network video cameras can be adjusted together with the requirements of each of the combination of network video cameras appropriately considered. In general, irrespective of where the updating functions occur, a method of producing the updated operating parameters for a particular network video camera may be a multiple input, multiple output process.

FIG. 6 is a flow chart illustrating a first specific example of a control method for the operation of a network video camera.

In this particular embodiment the adjustable operating parameters include the Frames Per Second (FPS) to be transmitted and the image Quality (Q). Each of these operating parameters is adjusted independently based on a respective measured parameter. The measured parameter used to update the FPS is an amount of Video Motion (VM) detected in a video stream, whereas the parameter used to update the Q is a measure of the Buffer Occupancy (BO), which is a measure of the unavailable capacity of the Tx buffer 95 (shown in FIG. 2) that in turn reflects an indirect measure of the available transmission bandwidth. In the present embodiment the Buffer Occupancy (BO) and Video Motion (VM) are measured and reported in a normalized range of 0 to 1.

At step 6-1 the operating parameters for the network video camera are initialized. Subsequently, the method splits into two independent threads beginning at steps 6-2 and 6-3, respectively, which occur in parallel for this particular embodiment.

The first thread starts with step 6-2 in which a delay of $T_1$ is enforced. After the delay of $T_1$, at step 6-4, the VM is measured and reported as described above. At step 6-6, the VM is used to calculate a new raw FPS, $FPS_{new}$, as a function of $FPS_{min}$ and $FPS_{max}$. Subsequently, at step 6-8, the newly calculated value of $FPS_{new}$ is rounded to a discrete value available in a pre-set selection set, which is used as the updated value for the FPS.

The second thread starts with step 6-3 in which a delay of $T_2$ is enforced. After the delay of $T_2$, at step 6-5, the BO is measured and reported as described above. At step 6-7, the BO is used to set the Q according to a look-up table relating the BO to indexed values for the Q. For example, indexed values for Q may include ratings of Very High, High, Medium, Low and Very Low corresponding to BO ranges of BO<0.6, 0.6<BO<0.7, 0.7<BO<0.8, 0.8<BO<0.9 and BO>0.9, respectively.

FIG. 7 is a flow chart illustrating a second specific example of a control method for the operation of a network video camera. In this particular embodiment the adjustable operating parameters include the Frames Per Second (FPS) to be transmitted, the image Quality (Q), and the encoding type (E). Each of these operating parameters is adjusted together based on a respective combination of measured parameters. In this particular embodiment, the combination of measured parameters includes VM and BO as defined above. Again, the Buffer Occupancy (BO) and Video Motion (VM) are measured and reported in a normalized range of 0 to 1.

At step 7-1 the operating parameters for the network video camera are initialized. Subsequently, at step 7-2, a delay of $T_3$ is enforced before measuring and reporting values for VM and BO at step 7-3. The measured values for the VM and BO are used to isolate a new combination of operating parameters in a look-up table at step 74. A very specific example of such a look-up table is provided in FIG. 8.

The look-up table illustrated in FIG. 8 includes a number of discrete ranges for measured values of VM and BO. The ranges for VM and BO define a grid or two-dimensional array. Each grid/array position is provided with a unique set of values for the operating parameters FPS, Q, and E. For example, if the measured values of VM and BO are 0.5 and 0.95, respectively, the corresponding values for FPS, Q and E are 5, Low, and MPEG4, respectively, as per the look-up table shown in FIG. 8.

Generally, a look-up table can be defined as a multi-dimensional array in which a set of ranges for each measured parameter defines a respective axis of the array. In such an array, a corresponding set of values for a set of adjustable operating parameters is provided in each array position.

What has been described is merely illustrative of the application of the principles of the invention. Accordingly, numerous modifications and variations of the present invention are possible in light of the above teachings. It is therefore to be understood that within the scope of the appended claims, the invention may be practiced otherwise than as specifically described herein.

The invention claimed is:

1. A surveillance network node comprising:
   (a) a power line modem;
   (b) a second modem;
   (c) a first switch for selecting one of the power line modem and the second modem for a transmission of surveillance information;
   (d) a second switch for selecting one of the power line modem and the second modem from which to receive remote information; and
   (e) a computer usable medium having computer readable code means embodied therein comprising instructions for:
      (i) measuring information relating to the power line modem and the second modem through the second switch; and
      (ii) based on the measured information from (i):
         (A) selectively signalling the first switch to select one of the power line modem and the second modem for transmission of surveillance information and
         (B) selectively signalling the second switch to select one of the power line modem and the second modem for receiving remote information.

2. A surveillance network node according to claim 1, wherein the surveillance information includes at least one of video information, audio information, and motion information.

3. A surveillance network node according to claim 1, wherein the computer readable code further comprises instructions for adaptively changing operating parameters of the surveillance network node based on at least one of surveillance source information, channel information, maximum delay tolerance, preferred data rate range, preferred frames per second range and preferred frame resolution range.

4. A surveillance network node according to claim 3, wherein the operating parameters include at least one of the number of Frames Per Second (FPS) transmitted, image Quality (Q), resolution, and encoding type.

5. A surveillance network node according to claim 1, wherein the computer readable code comprises instructions for adaptively changing the operation of the surveillance network node based on measured communication link conditions related to one of the power line modem and the second modem.

6. A surveillance network node according to claim 5, wherein the communication link conditions include available bit rate in a channel, delay, congestion, and any other system parameter that suitably provides an indication of the quality of the communication link.

7. A surveillance network node according to claim 1 further comprising a surveillance camera to transmit video information.

8. A surveillance network node according to claim 1 further comprising a local access node to co-ordinate one of the operation and access to a number of other surveillance network nodes.

9. A networked surveillance system comprising:
   (a) a plurality of surveillance network nodes each having a power line modem, a second modem, a first switch for selecting one of the power line modem and the second modem for transmission of surveillance information, a second switch for selecting one of the power line modem and the second modem from which to receive remote information and a controller for:
      (i) measuring information relating to the power line modem and the second modem through the second switch; and
      (ii) based on the measured information from (i):
         (A) selectively signalling the first switch to select one of the power line modem and the second modem for transmission of surveillance information and
         (B) selectively signalling the second switch to select one of the power line modem and the second modem for receiving remote information;
   (b) a client device configured to access surveillance information collected and transmitted by at least one of the surveillance network nodes.

10. A networked surveillance system according to claim 9 further comprising a local access node connectable between the client device and at least one of the surveillance network nodes.

11. A networked surveillance system according to claim 10, wherein the local access node is connectable to one of an internet, a private network and a virtual private network.

* * * * *